US012595737B2

(12) United States Patent
Lawliss et al.

(10) Patent No.: US 12,595,737 B2
(45) Date of Patent: Apr. 7, 2026

(54) TWO PIECE RETRACTABLE ENGINE CENTER BODY FOR BALANCING

(71) Applicant: RTX Corporation, Farmington, CT (US)

(72) Inventors: Nicholas J. Lawliss, West Hartford, CT (US); Adam David Vanover, Moodus, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/393,410

(22) Filed: Dec. 21, 2023

(65) Prior Publication Data

US 2025/0207498 A1 Jun. 26, 2025

(51) Int. Cl.
*F01D 5/02* (2006.01)
*F01D 5/10* (2006.01)

(52) U.S. Cl.
CPC ............... *F01D 5/027* (2013.01); *F01D 5/10* (2013.01); *F05D 2220/32* (2013.01); *F05D 2240/24* (2013.01); *F05D 2260/96* (2013.01)

(58) Field of Classification Search
CPC ........................................................ F01D 5/027
See application file for complete search history.

(56) References Cited

U.S. PATENT DOCUMENTS 9,784,215 B2 10/2017 Lu et al.
10,344,672 B2 7/2019 Scott
10,823,151 B2 11/2020 Bortoli et al.
2006/0053882 A1 3/2006 Lee et al.
2009/0039653 A1 2/2009 Beutin et al.
2015/0000304 A1 1/2015 Lindsey et al.
2022/0302801 A1 9/2022 Osama et al.

FOREIGN PATENT DOCUMENTS

FR 2908827 A1 * 5/2008 ................ F02C 7/04
FR 2980240 A1 * 3/2013 ............. F01D 5/066

OTHER PUBLICATIONS

European Search Report for EP Application No. 24223058.9 dated May 26, 2025.

* cited by examiner

*Primary Examiner* — Courtney D Heinle
*Assistant Examiner* — John S Hunter, Jr.
(74) *Attorney, Agent, or Firm* — Carlson, Gaskey & Olds, P.C.

(57) ABSTRACT

A gas turbine engine includes a propulsor having a rotor with blades, and an adapter connecting the rotor to a drive line at a connection. The drive line is connected to an accessory. The drive line and the accessory are received within a static center body. Bolts secure the adapter to the rotor. The center body has a rear end closely spaced from the connection, such that the center body limits access to the connection of the adapter to the rotor. The center body is formed with a forward portion and a separate rear portion defining the rear end. The forward portion and the rear portion are secured together. The rear portion is selectively slidable relative to the forward portion such that the rear portion can be moved away from the connection to provide access to change balance members. A method is also disclosed.

9 Claims, 6 Drawing Sheets

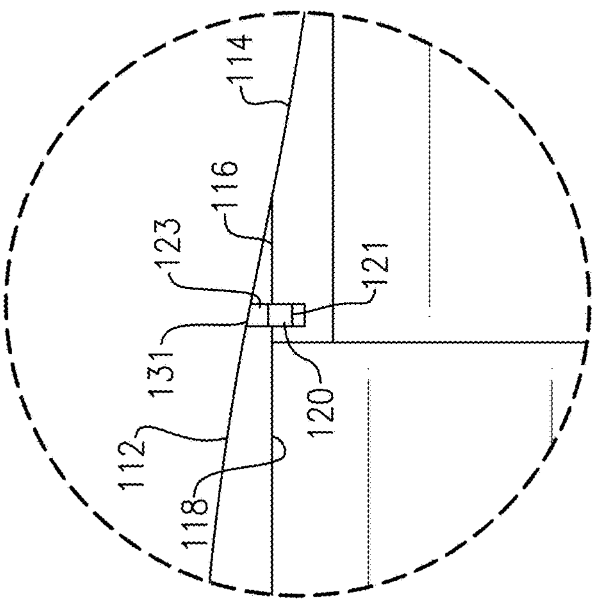
FIG.2A2
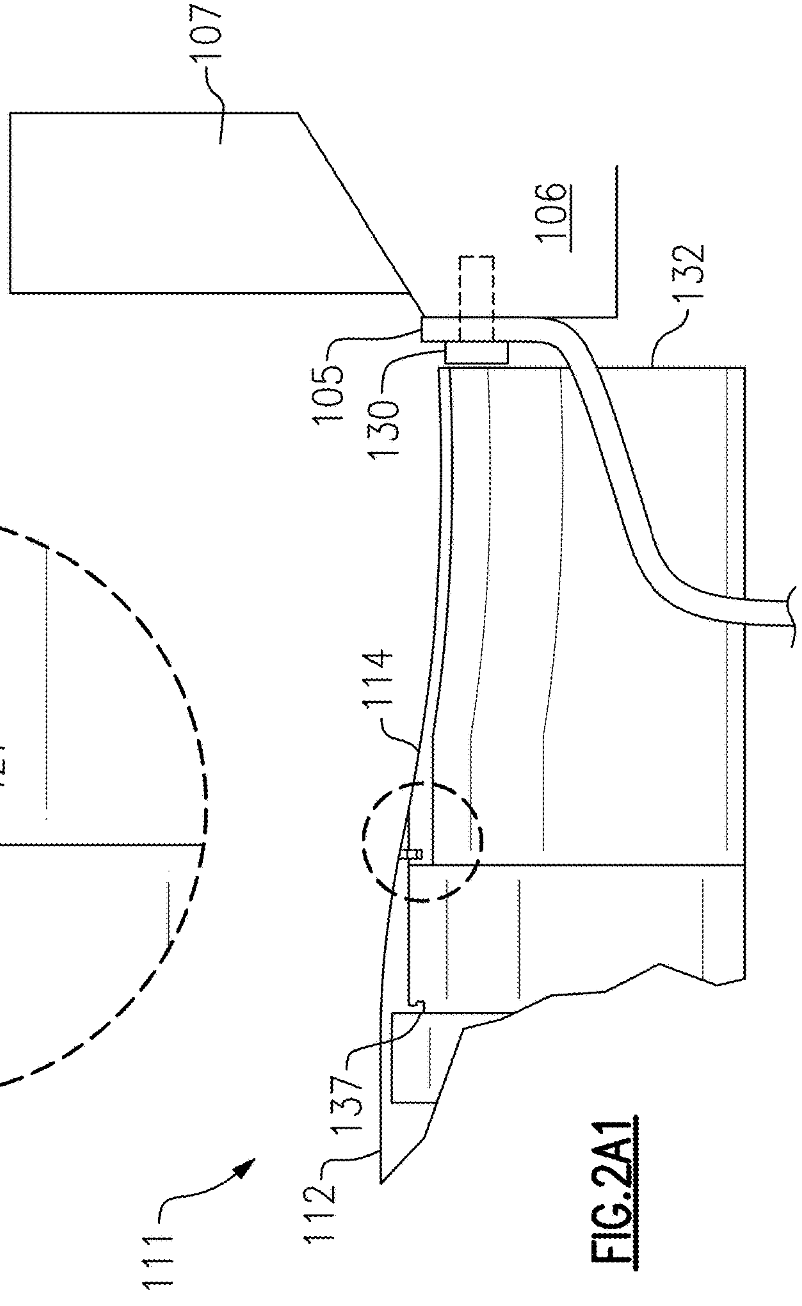
FIG.2A1

TWO PIECE RETRACTABLE ENGINE CENTER BODY FOR BALANCING

BACKGROUND OF THE INVENTION

This application relates to a gas turbine engine having a fixed center body.

Gas turbine engines are known, and typically include a propulsor delivering air into a bypass duct and into a core compressor. The propulsor typically rotates with a rotor having blades. It is known to provide balance weights on a rotating body in a gas turbine engine to address imbalances.

In one known gas turbine engine there is a fixed center body forward of an area where the balance weights are used.

Currently the center body must be removed to gain access to the balance area. This is cumbersome, and further requires the reattachment of the center body. This may cause the rotor to move back out of balance.

SUMMARY OF THE INVENTION

In a featured embodiment, a gas turbine engine includes a propulsor having a rotor with blades, and an adapter connecting the rotor to a drive line at a connection. The drive line is connected to an accessory. The drive line and the accessory are received within a static center body. Bolts secure the adapter to the rotor. The center body has a rear end closely spaced from the connection, such that the center body limits access to the connection of the adapter to the rotor. The center body is formed with a forward portion and a separate rear portion defining the rear end. The forward portion and the rear portion are secured together. The rear portion is selectively slidable relative to the forward portion such that the rear portion can be moved away from the connection to provide access to change balance members.

In another embodiment according to the previous embodiment, there is a forward groove formed in the forward portion and a rear groove formed in the rear portion. A securement member is received in the forward and rear grooves to secure the forward portion and rear portion together.

In another embodiment according to any of the previous embodiments, there is at least one hole through an outer surface of the forward portion, such that a tool can be inserted into the at least one hole to move the securement member out of the forward groove in the forward portion and such that the rear portion can be slid away from the balance member.

In another embodiment according to any of the previous embodiments, the securement member is a clip.

In another embodiment according to any of the previous embodiments, the clip is a snap ring having circumferentially spaced ends such that the snap ring does not extend around 360 degrees of an axis of rotation of the propulsor.

In another embodiment according to any of the previous embodiments, the securement member is a clip.

In another embodiment according to any of the previous embodiments, the clip is a snap ring having circumferentially spaced ends such that the snap ring does not extend around 360 degrees of an axis of rotation of the propulsor.

In another embodiment according to any of the previous embodiments, the bolts are changed as the balance members.

In another embodiment according to any of the previous embodiments, the balance members are adjacent the connection, and is an element other than the bolts.

In another embodiment according to any of the previous embodiments, the accessory is a generator.

In another embodiment according to any of the previous embodiments, a fan case surrounds the propulsor rotor and blades.

In another featured embodiment, a method of balancing rotating members in a gas turbine engine includes the steps of 1) providing a propulsor having a rotor and blades, and an adapter connecting the rotor to a drive line, the drive line received within a static center body having a forward portion and a separate rear portion, there being bolts securing the adapter to the rotor, the center body having a rear end closely spaced from the connection, such that the center body limits access to the connection, 2) moving the separate rear portion toward the forward portion and away from the connection with the forward portion remaining static, and 3) changing balance members to balance at least some rotating members.

In another embodiment according to any of the previous embodiments, there is a forward groove formed in the forward portion and a rear groove formed in the rear portion, and a securement member is received in the forward and rear grooves to secure the forward portion and the rear portion together, and step 2) including moving the securement member out of the forward groove.

In another embodiment according to any of the previous embodiments, there is at least one hole through an outer surface of the forward portion, and a tool is inserted into the at least one hole to move the securement member out of the forward groove and such that the rear portion can be moved away from the bolts.

In another embodiment according to any of the previous embodiments, a securement member is a clip.

In another embodiment according to any of the previous embodiments, the clip is a snap ring having circumferentially spaced ends such that the snap ring does not extend around 360 degrees of an axis of rotation of the propulsor.

In another embodiment according to any of the previous embodiments, the drive line drives an accessory.

In another embodiment according to any of the previous embodiments, the accessory is a generator.

In another embodiment according to any of the previous embodiments, the bolts are changed as the balance members.

In another embodiment according to any of the previous embodiments, the balance members are adjacent the connection, and is an element other than the bolts.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 2A1 shows a center body.

FIG. 2A2 shows a detail of the FIG. 2A1 center body.

DETAILED DESCRIPTION

Figure 1:
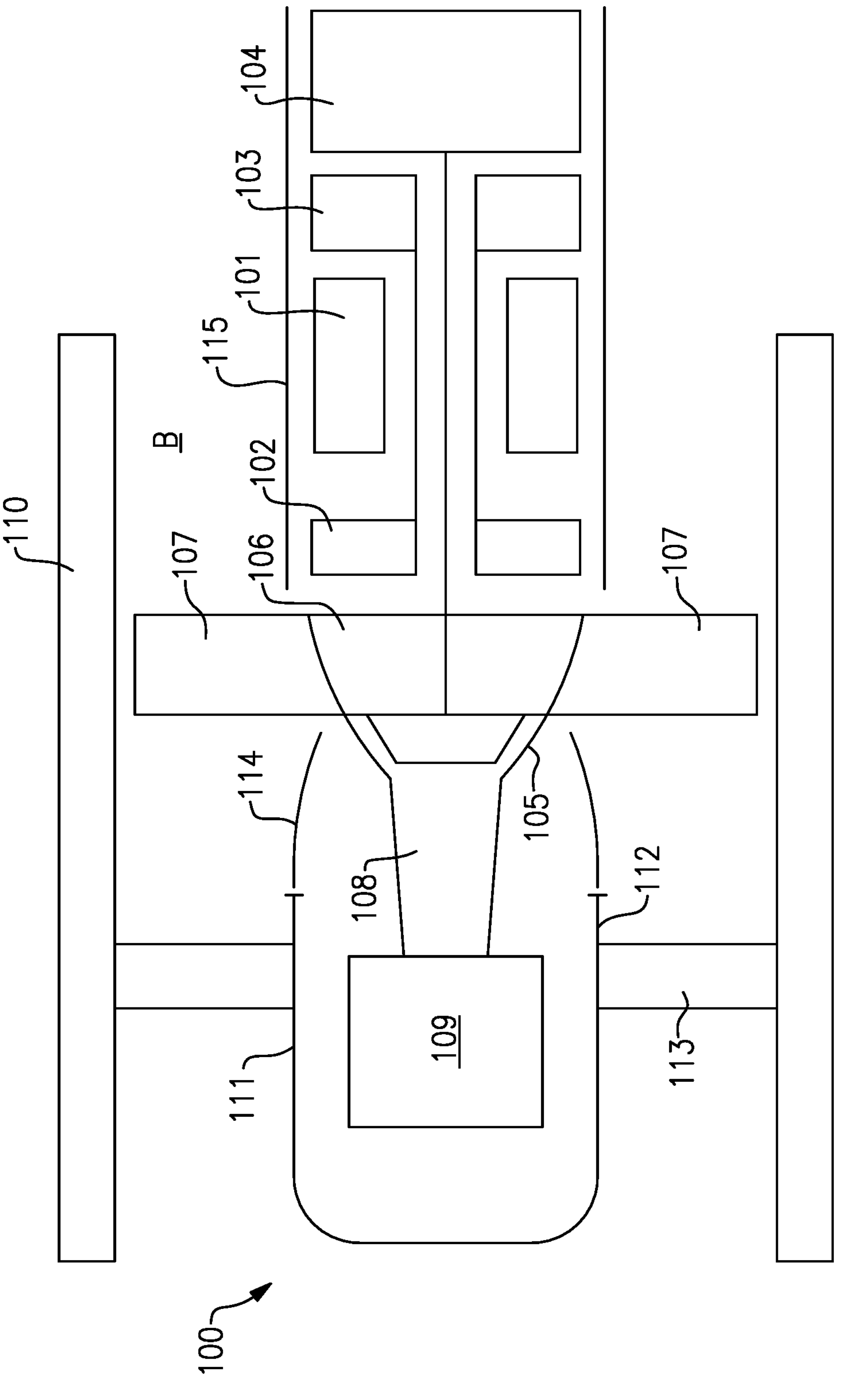
FIG. 1 schematically shows a gas turbine engine.

FIG. 1 shows a gas turbine engine 100 schematically. Combustor 101 receives compressed air from a compressor 102. Compressor 102 is driven by a turbine 103. Another turbine 104 drives a propulsor rotor 106, in turn connected to an adapter member 105. Propulsor rotor 106 drives propulsor blades 107. Adapter member 105 drives a drive shaft 108 that in turn drives a generator 109.

A fan case 110 surrounds and is secured to a static center body 111 having two portions, a forward portion 112 and a rear portion 114. Spars 113 fix forward portion 112 to the fan case 110.

The gas turbine engine 100 may operate as known. Propulsor blades 107 provide air into the compressor 102, and further into a bypass duct defined between a core housing 115 and the fan case 110.

During assembly and maintenance of the gas turbine engine 100 it is sometimes necessary to trim balance at the adapter member 105 and the hub 106 connection. In particular, one may sometimes need to gain access to bolts which are utilized to connect the two such that the classification or weight of the bolts may be changed to achieve better balancing for associated rotating components.

FIGS. 2A1 and 2A2 shows the center body 111 having the forward portion 112 and the rear portion 114. As shown, rear portion 114 has a cylindrical guiding surface 116 received within a cylindrical guiding surface 118 of the forward portion 112. A snap ring 120 is shown received in a groove 123 in the forward portion 112 and in a groove 121 on the outer surface 116 of the rear portion 114. As further shown, there are a plurality of holes 131 through an outer surface of the forward portion 112 and extending into groove 123.

Figure 2B:
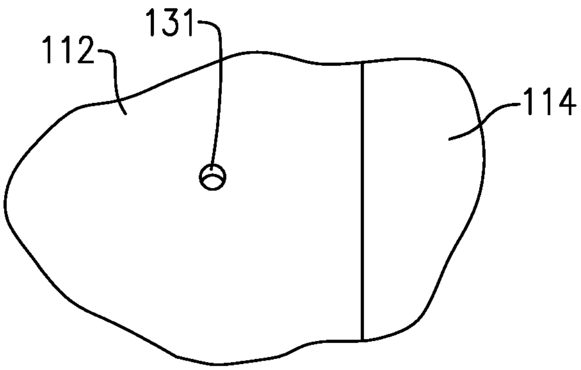
FIG. 2B shows a detail of the FIG. 2A center body.

FIG. 2B shows there are holes 131 to provide access to the ring 120. While one hole 131 is shown on the outer surface of the forward portion 112 in FIGS. 2A and 2B it should be understood there will typically be a plurality of such holes.

Returning to FIG. 2A, one can see a bolt 130 securing the adapter member 105 to the propulsor rotor 106. However, a rear end 132 of the rear portion 114 limits access to the bolt 130.

This application discloses a way of moving rear portion 114 such that the rear end 132 is spaced away from the location of the bolt to facilitate balancing of a rotor assembly.

Figure 2C:
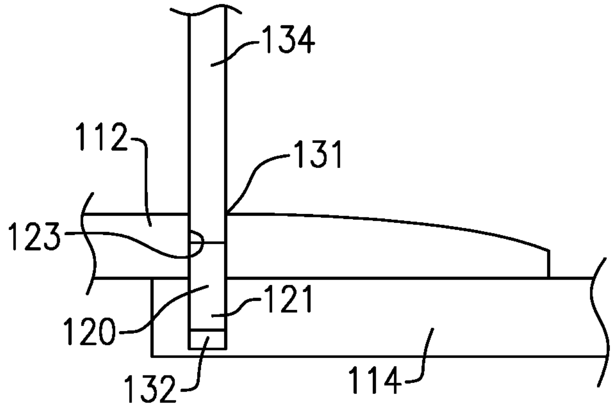
FIG. 2C shows a further detail of the center body.

FIG. 2C shows a pin 134 extending through the hole 131 to contact ring 120 and deflect it radially inwardly and out of groove 123. As shown, prior to this movement there is additional space 132 at a radially inner end of the groove 121.

Figure 2D:
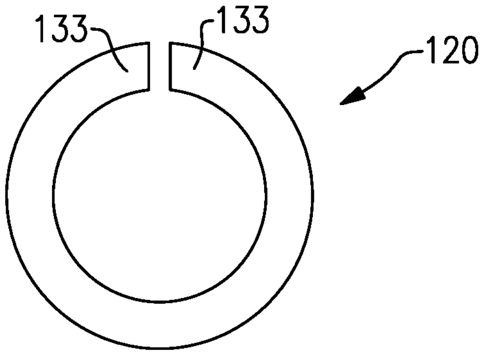
FIG. 2D shows a clip that secures two portions of the center body.

As shown in FIG. 2D, the clip 120 is generally cylindrical, however, it has ends 133 which are spaced by a small circumferential gap. This allows the clip 120 to collapse inwardly. Because of circumferentially spaced ends 133 the snap ring does not extend around 360 degrees of an axis of rotation of the propulsor.

Figure 3A:
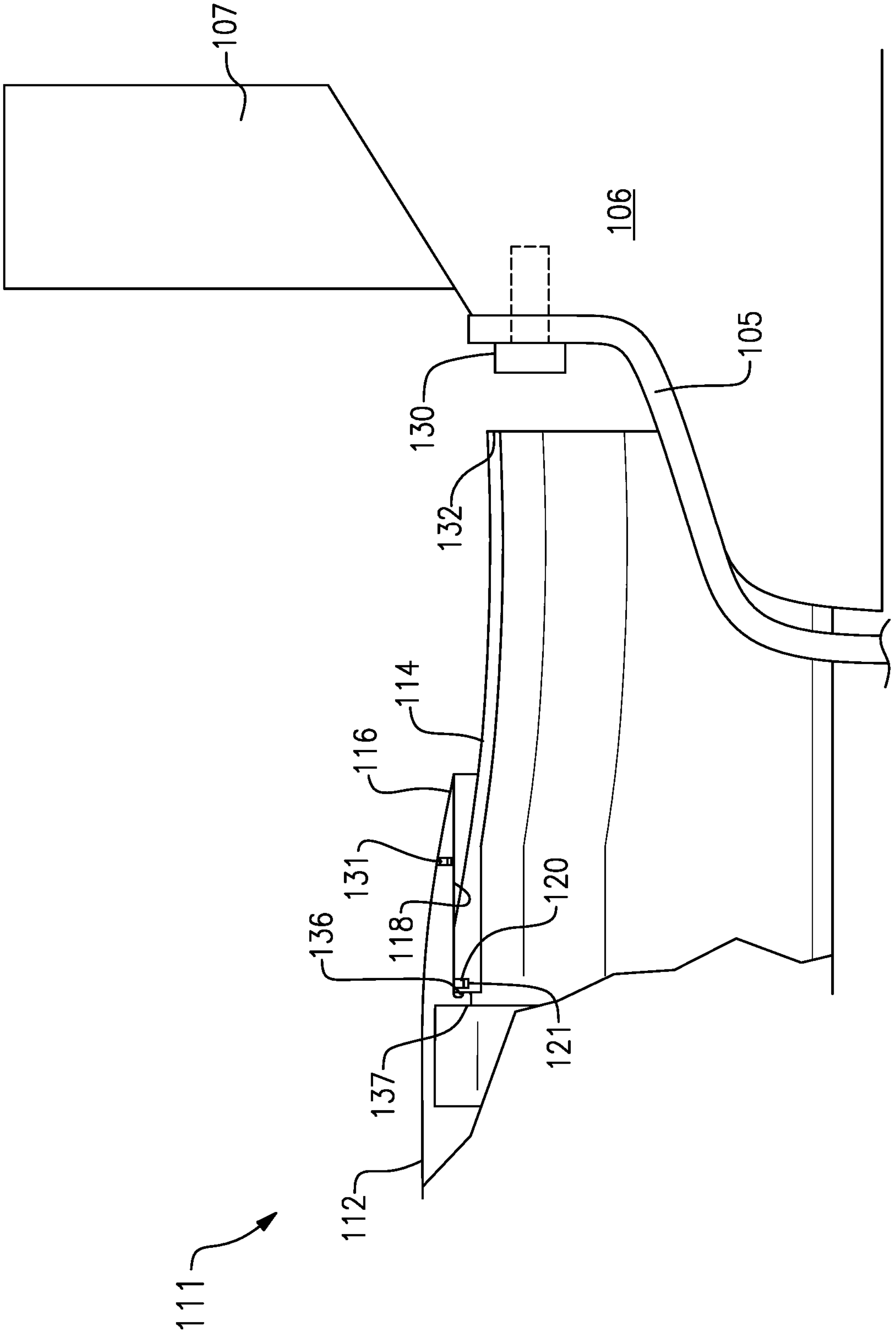
FIG. 3A shows one center body portion moved relative to another to provide access for balancing and on-wing or off-wing trim balancing.

FIG. 3A shows a step subsequent to FIG. 2C for balancing rotating portions of engine 100. The clip 120 has been moved inward of the groove 123 in the inner surface 118 of forward portion 112. At that point the housing member 114 is moved forwardly, or to the left between FIG. 2A to FIG. 3A. At that point, a forward end 136 of the rear portions 114 abuts a stop 137.

Now, when balancing is desired, the ring 120 is moved inwardly as shown in FIG. 2C and the rear portion 114 is moved forwardly or to the left to the FIG. 3A position. There is now good access to bolt 130.

Figure 3B:
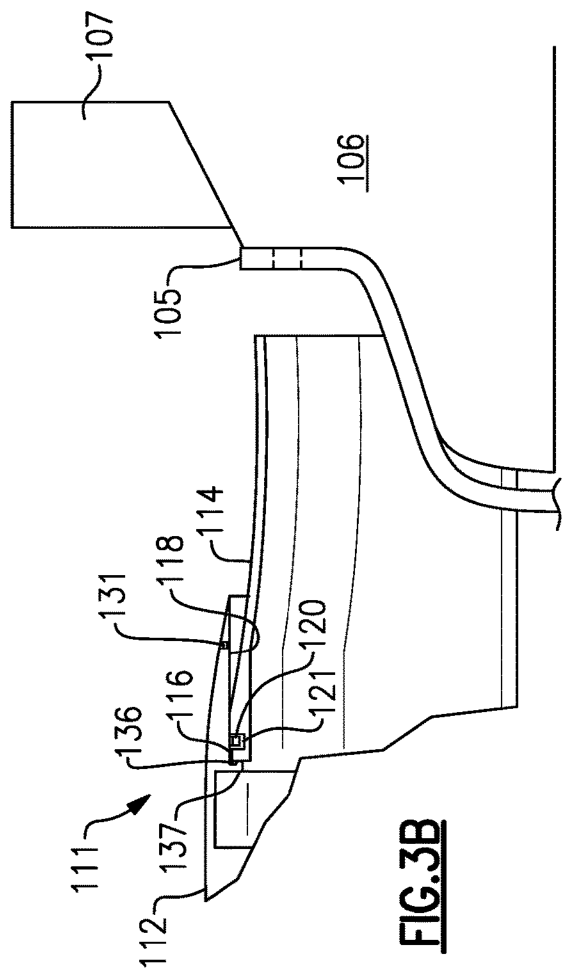
FIG. 3B shows a subsequent step in a balancing process.

FIG. 3B shows that the bolt 130 has now been removed. This would be done to allow the changing of the weight or class of bolt utilized to better balance the rotating portions of engine 100.

Figure 3C:
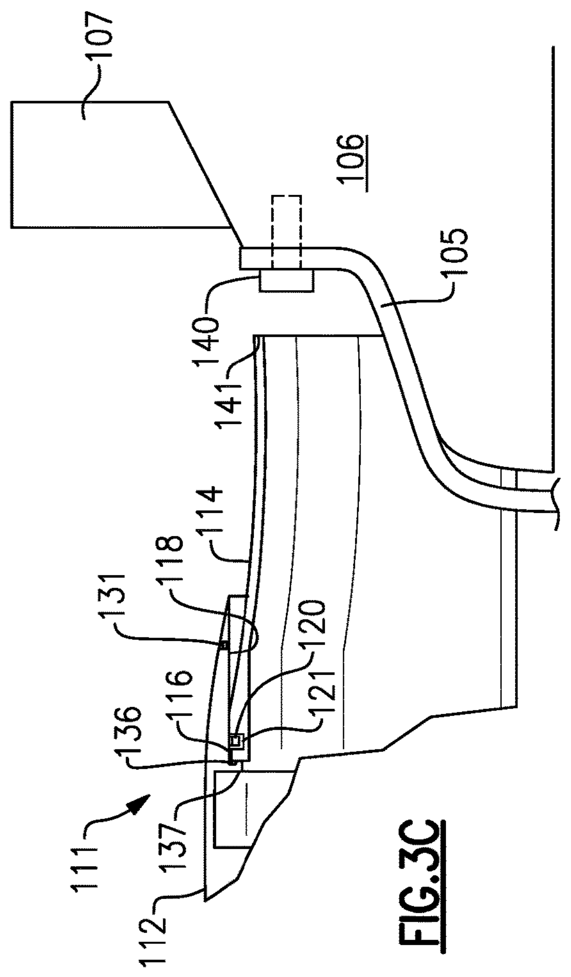
FIG. 3C shows yet another subsequent step in the balancing process.

Next, FIG. 3C shows that a new bolt 140 has replaced the bolt 130. Again, the bolt 140 would be of a different class or weight to achieve better balancing.

After the FIG. 3C step, the housing part 114 is merely moved rearwardly, or to the right from the FIG. 3A position back to the FIG. 2A position. At that point, the clip 120 has a bias that will cause it to spring back into the groove 123 securing the forward portion 112 and rear portion 114 together.

Figure 3D:
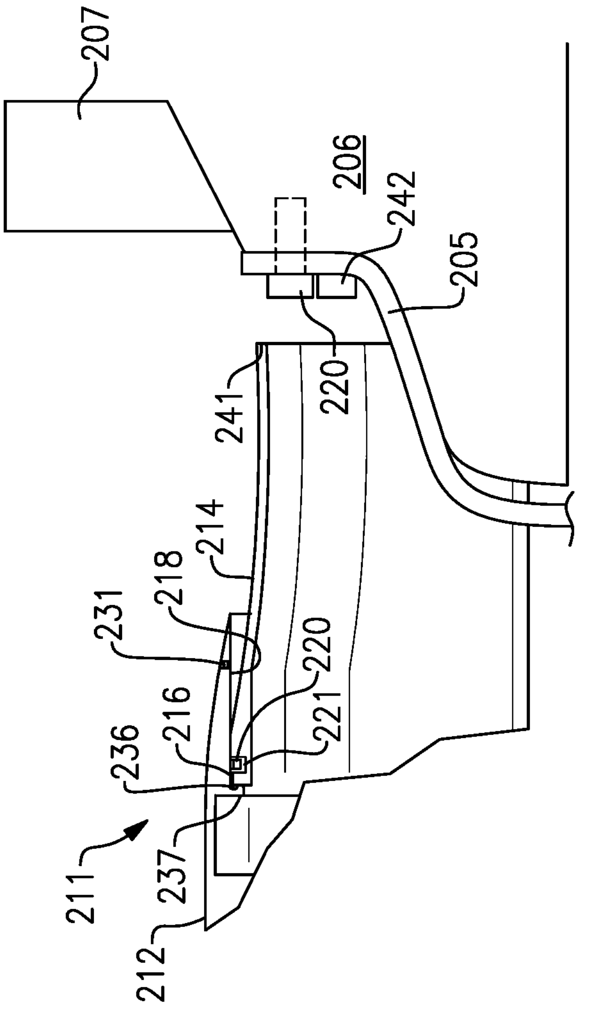
FIG. 3D shows another embodiment balancing member.

FIG. 3D shows another embodiment where the bolts are not changed for balancing. The reference numbers are all increased by 100 from FIG. 3C. Rather, a balancing member 242 adjacent the connection between the adapter 205 and the rotor 206 is changed. The balancing member 242 could be any number of balancing features. In examples, it could be a counterweight riveted to the rotor, a weighted snap ring that is spun to the connection, etc. The location and shape is shown schematically, and a worker of skill in this art would know the types of balancing members that may be utilized and changed. The details of this disclosure extend to providing access to the balancing member 242 for balancing. After balancing, the engine is returned to the FIG. 2A position.

A gas turbine engine under this disclosure could be said to include a propulsor having a rotor with blades. An adapter connects the rotor to a drive line. The drive line connects to an accessory. The drive line and the accessory are received within a static center body. Bolts secure the adapter to the rotor. The center body has a rear end closely spaced from the bolts, such that the center body limits access to a connection between the adapter and the rotor. The center body is formed with a forward portion and a separate rear portion defining the rear end. The forward portion and the rear portion are secured together. The rear portion is selectively slidable relative to the forward portion such that the rear portion can be moved away from the adapter to move the rear end away to provide access to the connection to allow balancing.

A method of balancing rotating members in a gas turbine engine under this disclosure could be said to include the steps of providing a propulsor having a rotor and blades, and an adapter connecting the rotor to a drive line. The drive line is received within a static center body having a forward portion and a separate rear portion. There are bolts securing the adapter to the rotor. The center body has a rear end closely spaced from the bolts, such that the center body limits access a connection between the adapter and the rotor. The method moves the separate rear portion toward the forward portion and away from the connection with the forward portion remaining static. Balance members are then changed to balance at least some rotating members.

Although an embodiment has been shown and disclosed, a worker of ordinary skill in this art would recognize that modifications would come within the scope of this disclosure. For that reason, the following claims should be studied to determine the true scope and content of this disclosure.

What is claimed is:

1. A method of balancing rotating members in a gas turbine engine comprising the steps of:

1) providing a propulsor having a rotor and blades, and an adapter connecting the rotor to a drive line, the drive line received within a static center body having a forward portion and a separate rear portion, there being bolts securing the adapter to the rotor, the center body having a rear end closely spaced from the connection, such that the center body limits access to the connection;

2) moving the separate rear portion toward the forward portion and away from the connection with the forward portion remaining static;

3) changing balance members to balance at least some rotating members; and wherein the separate rear portion moves away from the connection by moving radially inwardly of the forward portion.

2. The method as set forth in claim 1, wherein there is a forward groove formed in the forward portion and a rear groove formed in the rear portion, and a securement member is received in the forward and rear grooves to secure the forward portion and the rear portion together, and step 2) including moving the securement member out of the forward groove.

3. The method as set forth in claim 2, wherein there is at least one hole through an outer surface of the forward portion, and a tool is inserted into the at least one hole to move the securement member out of the forward groove and such that the rear portion can be moved away from the bolts.

4. The method as set forth in claim 3, wherein a securement member is a clip.

5. The method as set forth in claim 4, wherein the clip is a snap ring having circumferentially spaced ends such that the snap ring does not extend around 360 degrees of an axis of rotation of the propulsor.

6. The method as set forth in claim 1, wherein the drive line drives an accessory that is spaced from the propulsor.

7. The method as set forth in claim 6, wherein the accessory is a generator.

8. The method as set forth in claim 1, wherein the bolts are changed as the balance members.

9. The method as set forth in claim 1, wherein the balance members are adjacent the connection, and is an element other than the bolts.

* * * * *